US010551818B2

United States Patent
Volponi et al.

(10) Patent No.: US 10,551,818 B2
(45) Date of Patent: Feb. 4, 2020

(54) FAULT DETECTION METHODS AND SYSTEMS

(71) Applicant: United Technologies Corporation, Hartford, CT (US)

(72) Inventors: Allan J. Volponi, West Simsbury, CT (US); Liang Tang, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1106 days.

(21) Appl. No.: 14/952,516

(22) Filed: Nov. 25, 2015

(65) Prior Publication Data

US 2017/0146976 A1    May 25, 2017

(51) Int. Cl.
*G05B 19/406*    (2006.01)

(52) U.S. Cl.
CPC .. *G05B 19/406* (2013.01); *G05B 2219/31356* (2013.01)

(58) Field of Classification Search
CPC .... G05B 19/406; G05B 17/02; G05B 23/254; G05B 23/275; G05B 2219/31356
USPC .......................................................... 700/79
See application file for complete search history.

(56) References Cited

U.S. PATENT DOCUMENTS

| 7,383,165 B2* | 6/2008 | Aragones | G05B 17/02 701/100 |
| 2014/0100703 A1* | 4/2014 | Dull | G05B 17/02 700/289 |
| 2014/0222310 A1 | 8/2014 | Volponi et al. | |
| 2016/0260263 A1* | 9/2016 | Kando | G07C 5/004 |

OTHER PUBLICATIONS

Andre Kando, Machine Translation of "Diagnosis of Gas Turbine Aircraft Engines", Mar. 4, 2015, Espacenet Machine translation of EP 3064744 (Year: 2015).*

* cited by examiner

*Primary Examiner* — Brian W Wathen
*Assistant Examiner* — Christopher W Carter
(74) *Attorney, Agent, or Firm* — Snell & Wilmer, L.L.P.

(57) ABSTRACT

The present disclosure provides methods, systems, and computer-readable media for the fault detection and identification in an aircraft that may occur in real time during a flight, or any time the aircraft is operating. For example, a controller may receive and calculate various parameter values at various times during an aircraft flight, and compare those values to baseline values in order to determine if a fault has occurred. Additionally, the controller may identify a fault that has occurred by comparing a calculated fault signature value with a fault signature database comprising fault signatures and their associated faults.

10 Claims, 6 Drawing Sheets

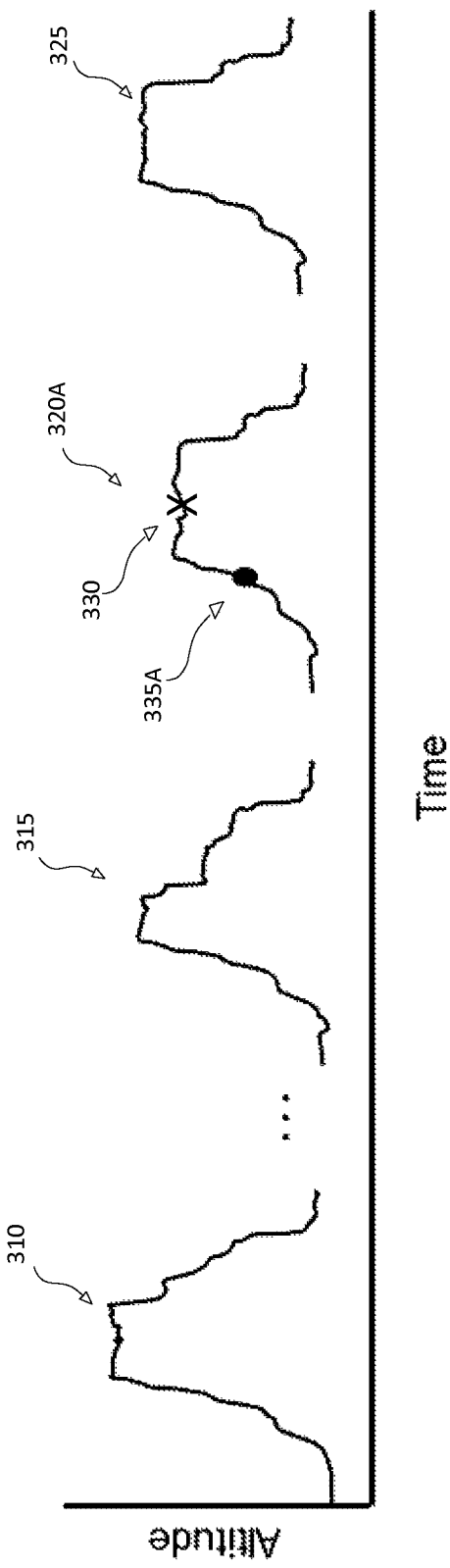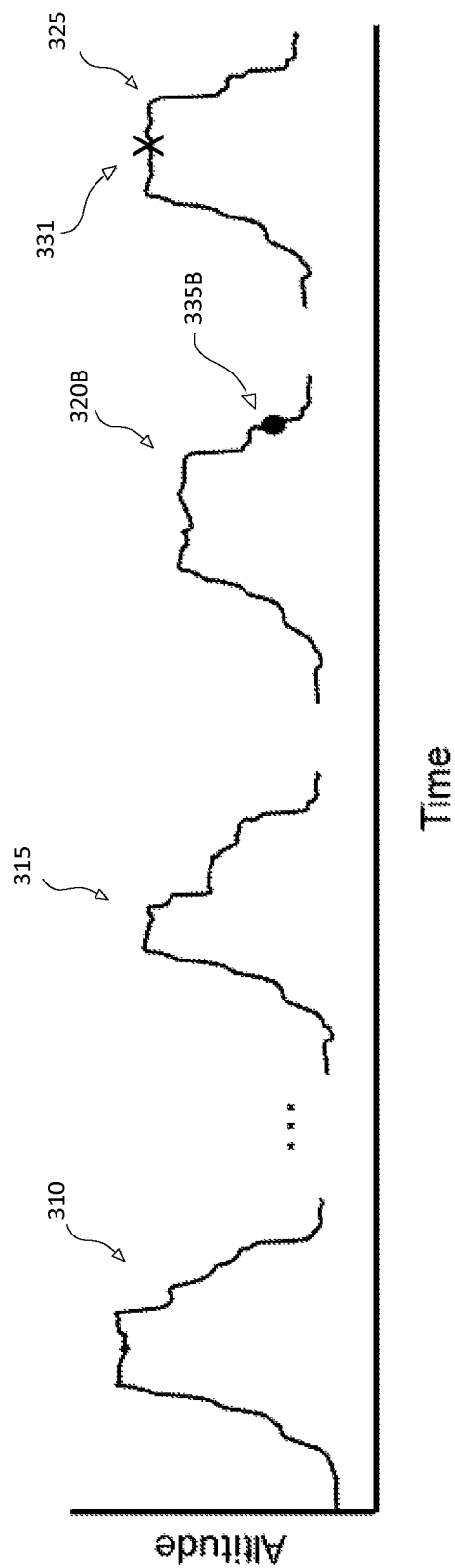

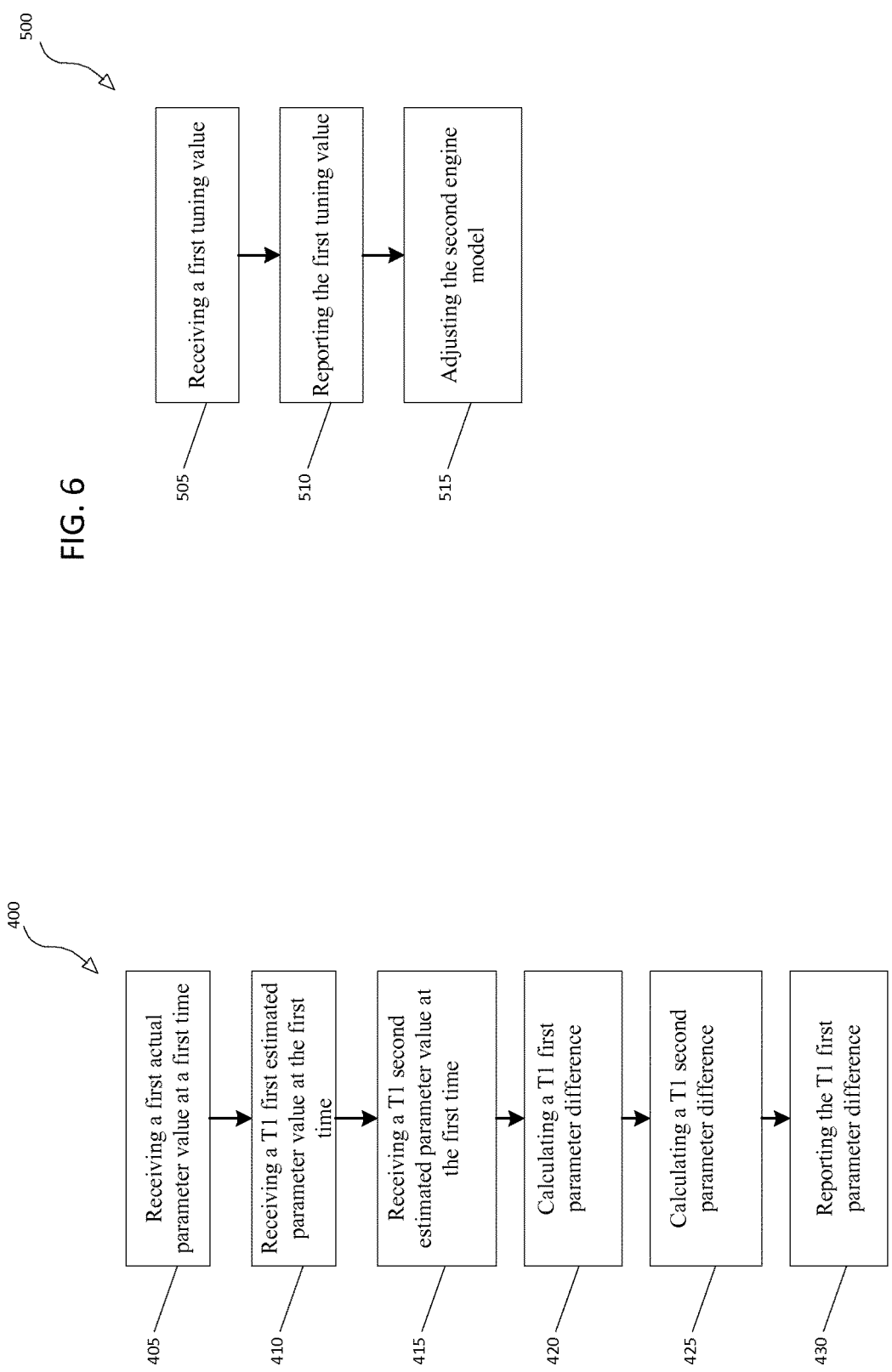

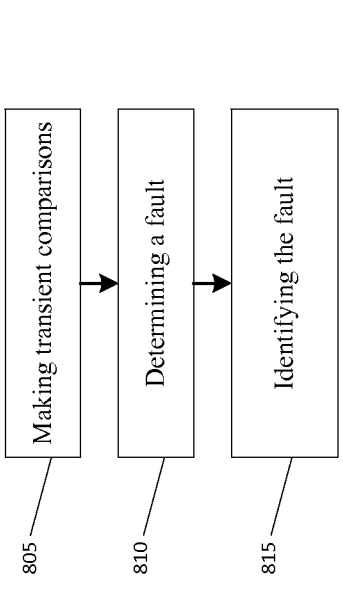
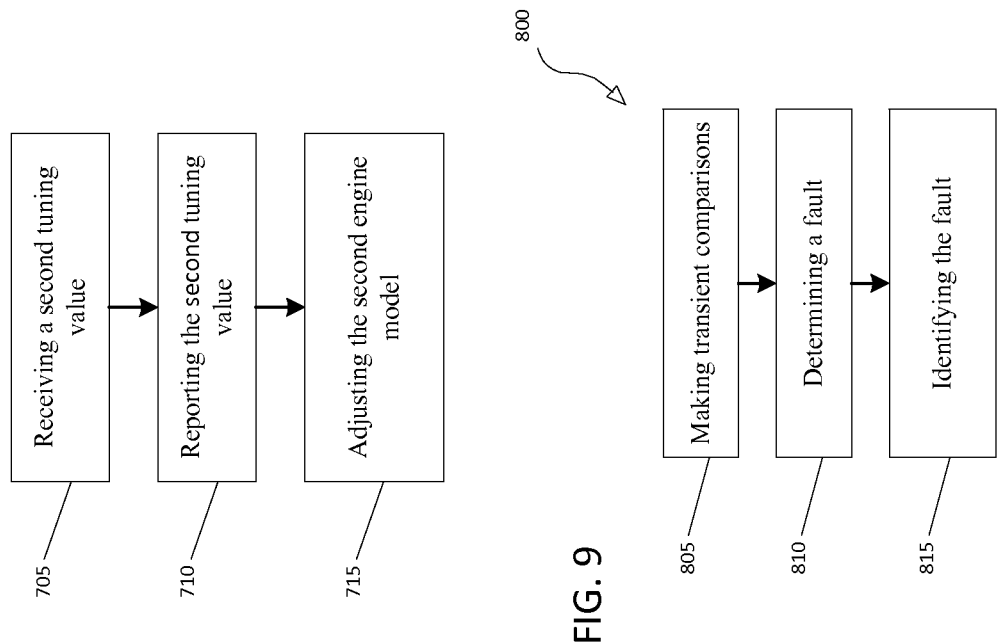
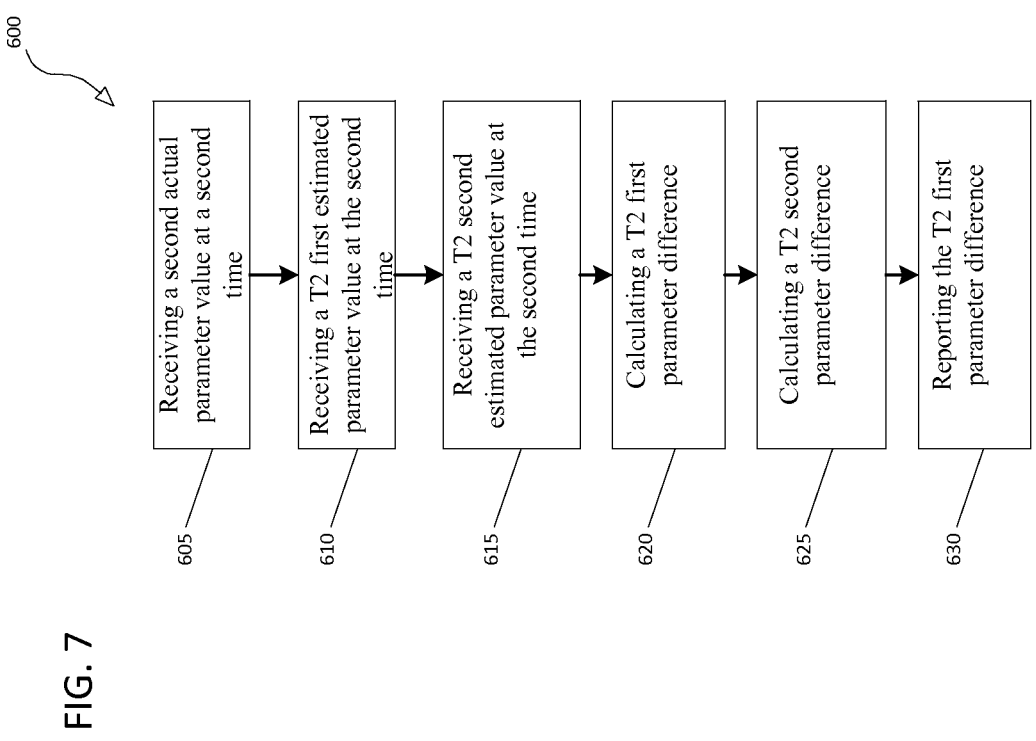

FAULT DETECTION METHODS AND SYSTEMS

FIELD OF THE DISCLOSURE

The present disclosure relates to fault detection systems and methods, and more particularly, to detecting engine module and subsystem faults and failures in gas turbine engines.

BACKGROUND OF THE DISCLOSURE

Gas turbine engines typically comprise a compressor module, a combustor module, and a turbine module, along with subsystems and accessories to control cooling, air bleed, variable geometry, etc. All these components of the gas turbine engine, along with their attendant sensors, wear over time and may be prone to fault or failure. Current fault detection methods are confined to off-board analysis of snapshot data averaged over stable flight conditions during steady-state operation of an engine. Additionally, such methodology only allows fault detection and identification after a suitable amount of flight data has been captured and analyzed.

SUMMARY OF THE DISCLOSURE

In various embodiments, the present disclosure provides methods, systems, and computer-readable media for the detection of gas turbine engine faults. The methods, systems, and computer-readable media for the detection of gas turbine engine faults described herein generally apply to fault detection and identification in a single gas turbine engine using the data received and analyzed by a controller from the single gas turbine engine.

In various embodiments, the present disclosure provides methods and systems of detecting faults in gas turbine engines. A system for fault detection in a gas turbine engine may comprise a parameter sensor in communication with a controller, engine models in communication with the controller configured to simulate an operational gas turbine engine and produce estimated parameter values, a performance observer in communication with the controller configured to produce tuner values, and a tangible, non-transitory memory in communication with the controller providing the controller with instructions to perform operations. An article of manufacture may also comprise a tangible, non-transitory memory in communication with a controller, causing the controller to perform operations. Such operations may comprise receiving actual parameter values from the parameter sensor at different times, receiving estimated parameter values from the engine models, calculating parameter differences based on differences between the estimated and actual parameter values, and reporting parameter differences at different times to a baseline database for the gas turbine engine, if the parameter differences are not above a predetermined detection threshold. The controller operations may further comprise receiving tuning values at different times from the performance observer configured to adjust one of the engine models, reporting the tuning values to the baseline database, and adjusting one of the engine models using the tuning values. The controller operations may further comprise determining whether a fault has occurred in the gas turbine engine based on comparisons between the parameter differences, between the difference in the tuning values, and comparisons of the parameter differences and tuning values with their respective baseline values. The method may further comprise identifying the fault by calculating a first parameter difference fault signature based on the difference between the first parameter difference baseline and a first parameter difference with a highest quality number from the current aircraft flight, and comparing the fault signature with a fault signature database comprising fault signatures and their associated faults. The operations of the controller may further comprise assigning a quality number to each of the tuning values and parameter differences, and the quality numbers may be between a value of zero and one. These functions of the systems and methods of fault detection may be employed in real time during an aircraft flight and the operations of the controller or the components of the method may be repeated as many times as desired during an aircraft flight. The controller may be a full authority digital engine control ("FADEC"), or the controller may be a dedicated engine health monitoring device separate from the FADEC.

In various embodiments, a method for fault detection in a gas turbine engine may comprise receiving actual parameters values at different times observed by a parameter sensor in communication with a controller, receiving estimated parameter values at different times from engine models, calculating parameter differences based on the differences between the actual and estimated parameter values, receiving tuning values from a performance observer based on the magnitudes of the parameter differences, reporting the parameter differences and tuning values to a baseline database, and adjusting an engine model at different times using tuning values received from the performance observer. The method may further comprise determining whether a fault has occurred in the gas turbine engine by comparing the parameter differences, comparing the tuning values, and comparing tuning values and the parameter differences to baseline values in the baseline database. The method may further comprise identifying the fault by calculating fault signatures based on differences between the baseline values and the tuning values and/or the parameter differences with the highest quality numbers, and comparing the fault signature with a fault signature database comprising fault signatures and their associated faults. These operations may be performed by the computer-based controller and may be employed in real time during an aircraft flight. Such operations may be repeated as many times as desired.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

FIGS. 4A and 4B are graphic illustrations of aircraft flights comprising a system for fault detection;

FIG. 5 depicts a flowchart illustrating a method for fault detection in an aircraft, in accordance with various embodiments;

FIG. 6 depicts a flowchart illustrating a method for fault detection in an aircraft, in accordance with various embodiments;

FIG. 7 depicts a flowchart illustrating a method for fault detection in an aircraft, in accordance with various embodiments;

FIG. 8 depicts a flowchart illustrating a method for fault detection in an aircraft, in accordance with various embodiments; and FIG. 9 depicts a flowchart illustrating a method for fault detection in an aircraft, in accordance with various embodiments.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other systems. As such, numerous applications of the present disclosure may be realized.

Figure 1:
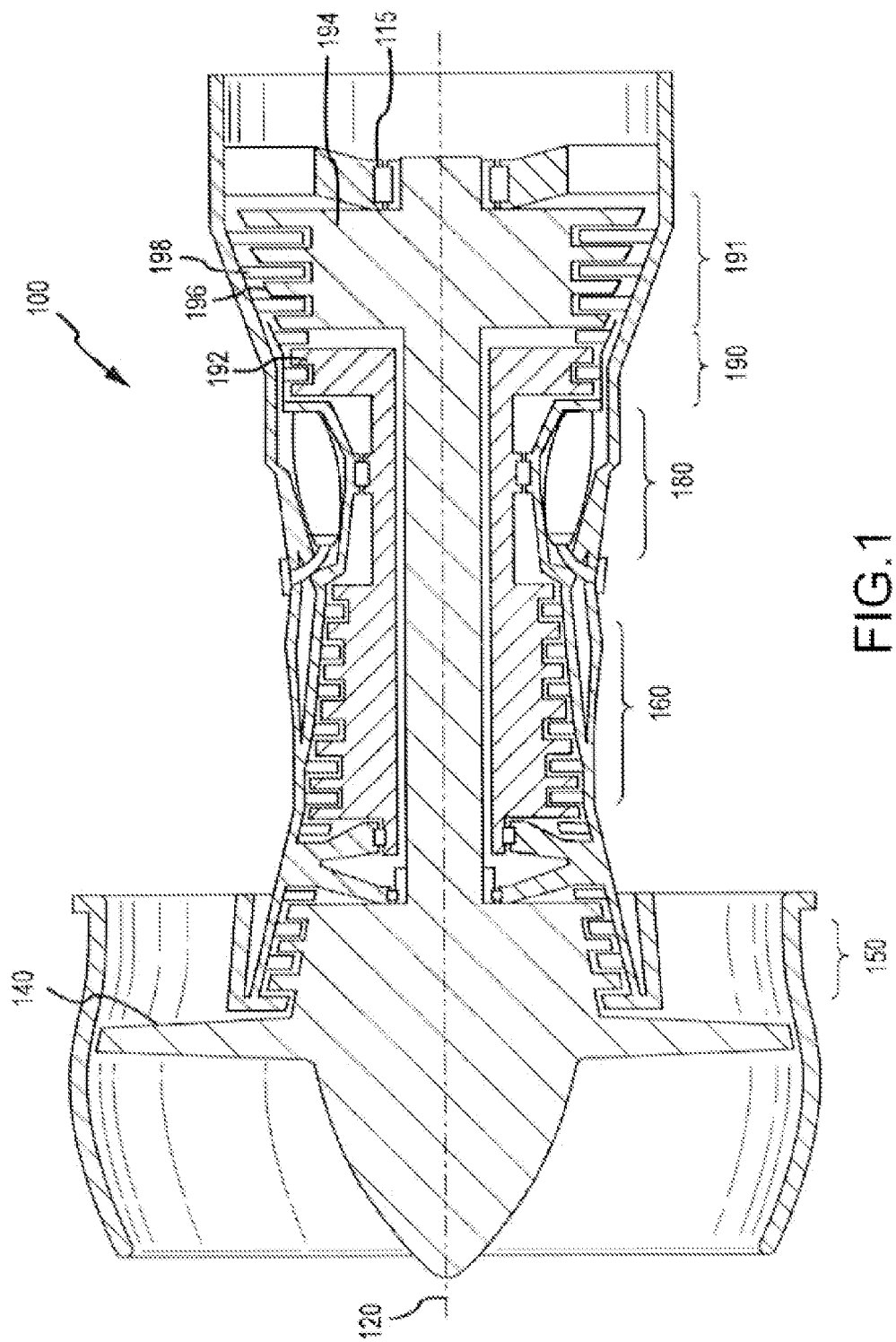
FIG. 1 illustrates a cross-sectional view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. The fan 140 may drive air into compressor sections 150, 160, which further drive air along a core flow path for compression and communication into the combustion section 180. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of applications and to all types of turbine engines, including turbofan gas turbine engines and turbojet engines.

Figure 2:
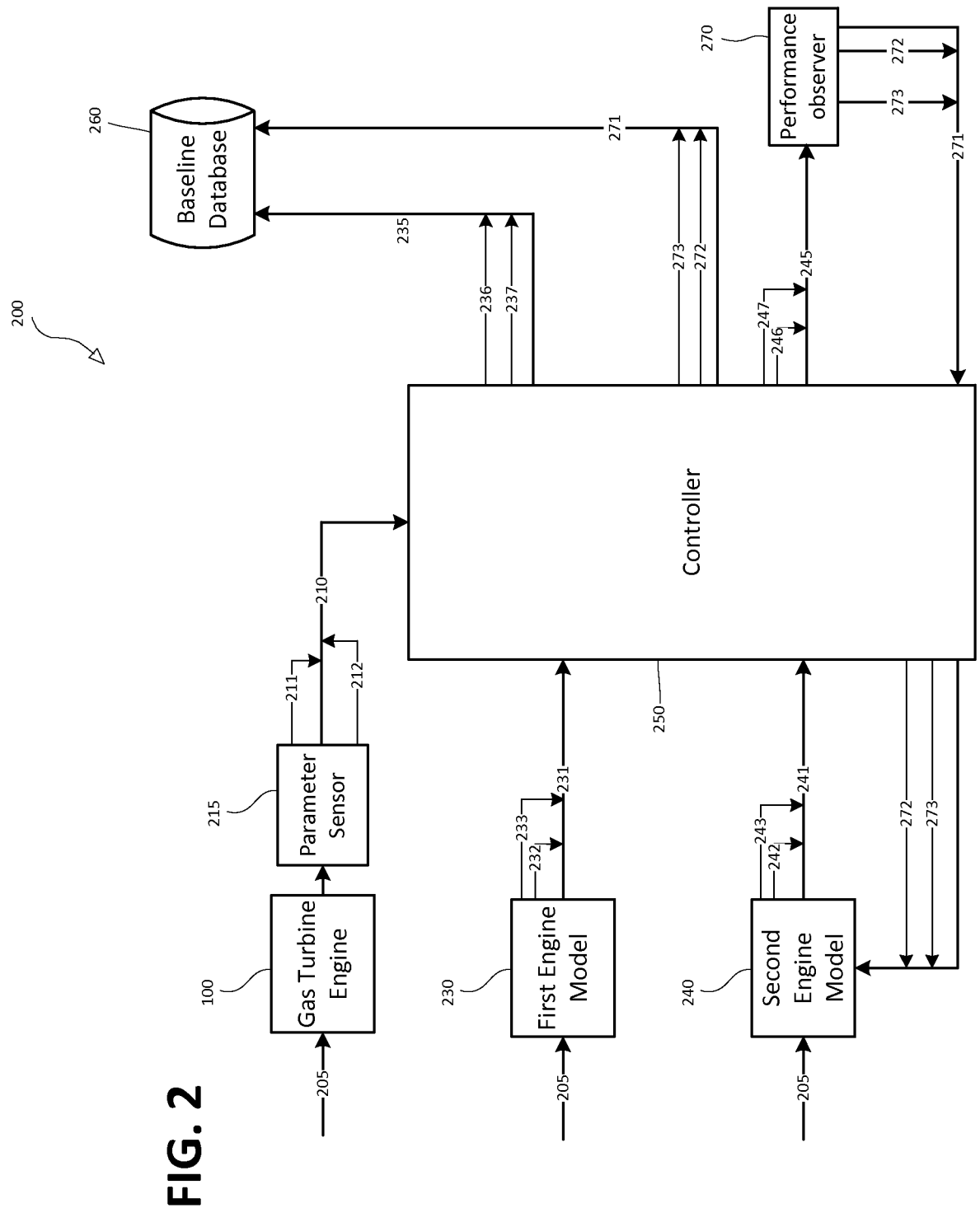
FIG. 2 illustrates a schematic diagram of a system for fault detection in accordance with various embodiments.

Referring to FIG. 2, according to various embodiments, a schematic diagram of a system for fault detection 200 is depicted. The gas turbine engine 100 receives a number of input values 205 at any given point in time, such as fuel flow, pressure, temperature, spool speed, etc., which represent the conditions under which the gas turbine engine 100 is commanded to operate. The gas turbine engine 100 will produce actual parameter values 210 at different time intervals that reflect actual operating conditions that were achieved based upon the input values 205. To determine the actual parameter values 210 produced by the gas turbine engine 100, the gas turbine engine 100 may comprise one or more of a pressure sensor, a temperature sensor, a fuel flow sensor, or any sensor that would measure the parameter value for a certain engine component or function. The parameter sensor 215, as depicted in FIG. 2, may be any of these parameter sensors, or all these parameter sensors.

In order to detect a fault in the function of a gas turbine engine, estimated parameter values may be produced representing how the gas turbine engine is predicted to perform, if performing without fault, in response to receiving specific input values. Engine models may be used to produce such estimated parameter values. The engine models used to produce the estimated parameter values may be physics-based, empirically based, or a hybrid of the two. The engine models may receive the same input values as the gas turbine engine, representing the conditions under which the gas turbine engine is being commanded to operate, and may be calibrated to produce estimated parameter values of a desired level. Therefore, based on the input values and calibration, the engine models may produce estimated parameter values which the gas turbine engine, if operating without fault, is predicted to produce. When the estimated parameter values are compared to actual parameter values produced by the gas turbine engine, a controller calculates parameter differences. The engine models may be calibrated to produce estimated parameter values that result in parameter differences having values, of zero, one, or any other desired value. For simplicity, and as an example used in this disclosure, the desired value for parameter differences may be a value of zero.

The system for fault detection 200 depicted in FIG. 2 may comprise a first engine model 230 and a second engine model 240, both of which may receive the same input values 205 that the gas turbine engine 100 receives. The first engine model 230 may produce first estimated parameter values 231 and the second engine model 240 may produce second estimated parameter values 241 at different time intervals.

In various embodiments, the parameter sensor 215 may be in communication with a controller 250. In various embodiments, the controller may comprise a full authority digital engine control (FADEC) system. A controller may comprise a processor configured to implement various logical operations in response to execution of instructions, for example, instructions stored on a non-transitory, tangible, computer-readable medium. The controller 250 may receive the actual parameter values 210 from the parameter sensor 215. The controller 250 may also be in communication with the first engine model 230 and the second engine model 240 and may receive the first estimated parameter values 231 and the second estimated parameter value 241 from the first engine model 230 and the second engine model 240, respectively. The controller 250 may calculate first parameter differences 235 by subtracting the first estimated parameter values 231 from the actual parameter values 210. Likewise, the controller 250 may calculate second parameter differences 245 by subtracting the second estimated parameter values 241 from the actual parameter values 210. In various embodiments, the first parameter differences 235 and the second parameter differences 245 may be calculated by subtracting the actual parameter values 210 from the first estimated parameter values 231 and the second estimated parameter values 241, respectively. With momentary reference to FIGS. 2 and 3, once these values are received and calculated by the controller 250, the controller 250 may report the first parameter differences 235 to a baseline database 260 to establish a first parameter difference baseline 261 of the magnitude of the first parameter differences over a number of time intervals and/or flights (e.g., k flights). The controller 250 may report the first parameter differences 235 to the baseline database 260 if the first parameter differences 235 are values not above a predetermined detection threshold. Values above the predetermined detection threshold may indicate a fault and may not be used to establish a first parameter difference baseline 261.

Returning to FIG. 2, in various embodiments, a performance observer 270 may be in communication with the controller 250 and the second engine model 240. The performance observer 270 may be configured to produce tuning values 271. The performance observer 270 may receive the second parameter differences 245, and if they are not at a value of zero (or any other desired value based on the engine model calibration), the performance observer 270 may produce tuning values 271. The greater the magnitude of the second parameter differences 245, the greater the magnitude will be of the tuning values 271 produced by the performance observer 270 to adjust the second engine model 240. The adjustment of the second engine model 240 is aimed to produce second parameter differences 245 of less magnitude at future times. With momentary reference to FIGS. 2 and 3, the tuning values 271 may be received by the controller 250 and reported to the baseline database 260 to establish a tuning value baseline 266 of the magnitude of the tuning values over a number of time intervals and/or flights (e.g., k flights). The controller 250 may report the tuning values 271 to the baseline database 260 if the tuning values 271 are values not above a predetermined detection threshold. Values above the predetermined detection threshold may indicate a fault and may not be used to establish the tuning value baseline 266.

In various embodiments, the tuning values 271 produced by the performance observer 270 may comprise values to adjust the second engine model 240, causing it to produce second estimated parameter values 241 at future times that may result in second parameter differences 245 closer to zero (or any other desired value based on the engine model calibration). For example, the tuning values 271 may change adiabatic efficiency of the fan 140 and/or compressor sections 150 and 160 in the second engine model 240, or the tuning values 271 may change any other portion of the second engine model 240 to cause a decrease in the magnitude of the second parameter differences 245.

Figure 3:
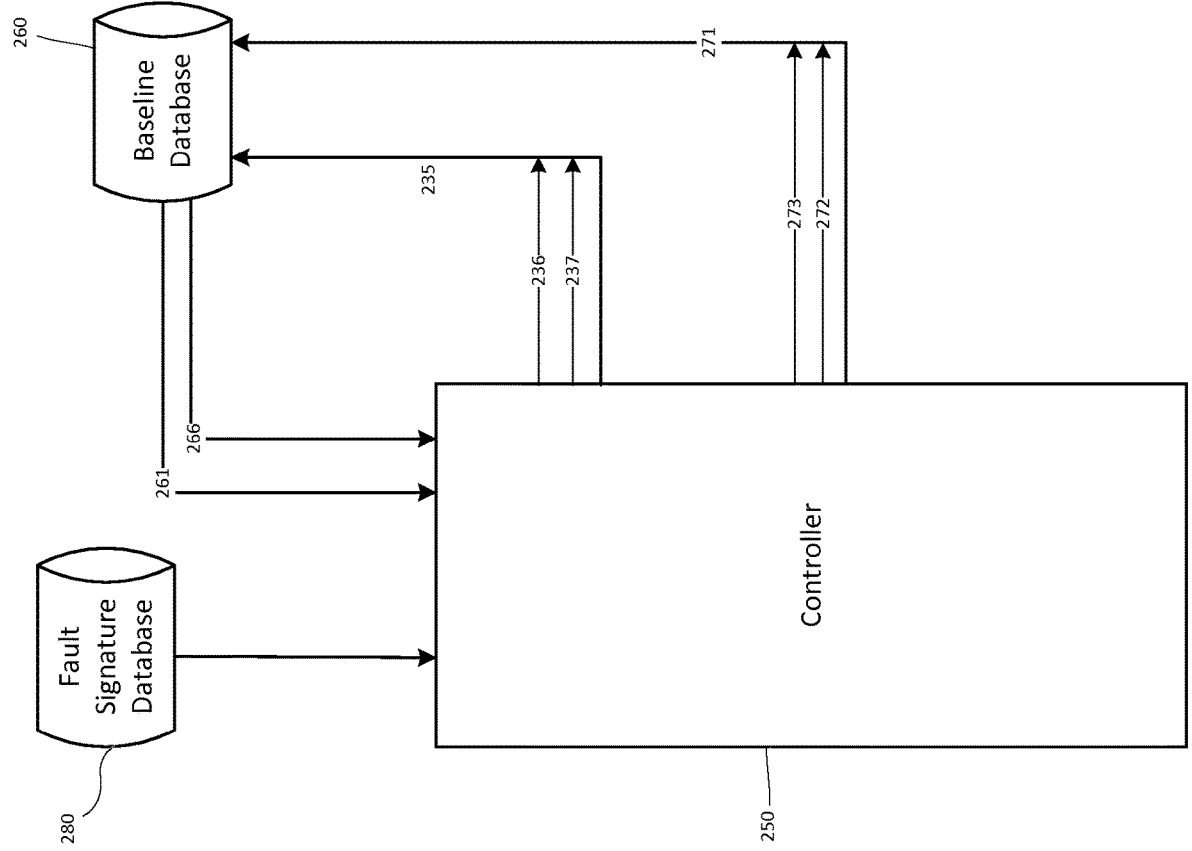
FIG. 3 illustrates a schematic diagram of a system for fault detection and identification in accordance with various embodiments.

With reference to FIGS. 2 and 3, in various embodiments, after the operations described in the foregoing paragraphs take place by the controller 250, the controller 250 may compare the values produced and calculated to determine whether a fault has occurred in the gas turbine engine 100. For example, the controller 250 may make transient comparisons between the first parameter differences 235 collected over time, and/or between the tuning values 271 collected over time. If the first parameter differences and/or the tuning values have magnitudes that are above the predetermined detection threshold that may indicate a fault, or are not moving toward a value of zero (or any other desired value based on the engine model calibration), a fault in the gas turbine engine 100 may be detected. In other words, the controller may be comparing the values to determine if the gas turbine engine 100 is performing at a consistent level. If there is an abrupt change within the first parameter differences 235 and/or within the tuning values 271, the abrupt change may indicate a fault has occurred in the gas turbine engine 100. In various embodiments, the controller 250 may detect a fault by comparing the first parameter differences 235 to the first parameter difference baseline 261, and/or comparing the tuning values 271 to the tuning value baseline 266. If the first parameter differences and/or tuning values are consistent with the baseline data from k flights, during which the engine operated without fault, there may be no fault detected in the gas turbine engine 100. If not, this may indicate a fault in the gas turbine engine. In general, when first parameter differences and/or tuning values have magnitudes that are above predetermined detection thresholds, and/or differ from the first parameter difference baseline or tuning value baseline, respectively, that may indicate an abrupt change in gas turbine engine performance, which may be caused by, and indicate, an engine fault.

In various embodiments, the system for fault detection 200 may operate in a steady state in which the input values 205 are substantially constant over time, such as when an aircraft is idling or cruising at a constant altitude. The system for fault detection 200 may not operate in transient states. The term "transient state" may describe conditions under which the gas turbine engine operates, where the parameter values have rates of change that are above a transient threshold. In various embodiments, the system for fault detection 200 may operate when the aircraft is in a quasi-steady state. The term "quasi-steady state" may describe aircraft operating conditions under which parameter values from a gas turbine engine change, but their rate of change is below the transient threshold. If the parameter value rates of change are below the transient threshold, the calibration to the engine models may be applied to the operating conditions, and therefore, the data produced and collected by the system for fault detection 200 may be used to detect and identify faults in the gas turbine engine 100. Therefore, any conditions under which the calibration to the engine models applies may be considered a quasi-steady state. Quasi-steady states may include states, such as take-off, altitude climb, descent, or landing. Such states may be transient states at times if the parameter values' rates of change are above the transient threshold.

In various embodiments, when the system for fault detection 200 is operating in a quasi-steady state, the controller 250 may also assign a quality number to each first parameter difference 235 and each tuning value 271 to determine whether each value is suitable to use for fault detection and identification. The quality number may be determined by the reliability of the value calculated by the controller 250 based on the conditions in which the gas turbine engine 100 was operating when the controller 250 made the calculation. In a "hard" transient state, such as take-off, if the calibration of the engine models 230 and 240 applies to the state, making such a state a quasi-steady state, the quality number for any calculation by the controller 250 may be low in such a state, making the calculated value less reliable. The quality number assigned to a value calculated by the controller 250 may be a value between zero (0) and one (1), where one (1) represents stable, reliable data, and zero (0) represents data that may be unreliable for fault detection and identification.

With reference to FIG. 3, in various embodiments, when a fault is detected, the first parameter difference 235 and/or the tuning value 271 for which the fault was detected may then be calculated or received, respectively, by the controller 250, and the controller 250 may calculate a fault signature for each value. The first parameter fault signature may be calculated, by the controller 250, by subtracting the first parameter difference baseline 261, taken from the baseline database 260, from one of the first parameter differences 235. The first parameter fault signature may also be calculated, by the controller 250, by subtracting one of the first parameter differences 235 from the first parameter difference baseline 261, taken from the baseline database 260. The first parameter difference used in the calculation would be the one, produced during an aircraft flight, with the highest quality number of the first parameter differences that indicated a fault. The first parameter fault signature may then be compared, by the controller, to a fault signature database 280 which may comprise first parameter fault signatures and the faults associated with each first parameter fault signature. A fault in the fault signature database 280 that has a first parameter fault signature that most closely matches the first parameter fault signature being compared may be the fault that occurred in gas turbine engine 100. Similarly, the tuning value fault signature may be calculated by subtracting the tuning value baseline 266, taken from the baseline database 260, from one of the tuning values 271. The tuning value fault signature may also be calculated by subtracting one of the tuning values 271 from the tuning value baseline 266, taken from the baseline database 260. The tuning value used in the calculation would be the one, produced during an aircraft flight, with the highest quality number out the tuning values indicating a fault. The tuning value fault signature may then be compared to the fault signature database 280, which may further comprise tuning value fault signatures and the faults associated with each tuning value fault signature. A fault in the fault signature database 280 that has a tuning value fault signature that most closely matches the tuning value fault signature being compared may be the fault that occurred in gas turbine engine 100. Examples of faults that may occur in a gas turbine engine 100 may be fan blades that have eroded or the decreasing of the compressor sections' 150 and/or 160 flow capacity. In various embodiments, the system for fault detection 200 may operate under a single-fault assumption. The process for fault detection and identification may take place after a flight has occurred, or in real time during the flight.

In various embodiments, the foregoing operations performed by the controller 250, in which the first parameter differences 235 and the second parameter differences 245 are calculated, the first parameter differences 235 are reported to the baseline database 260, the tuning values 271 are used to adjust the second engine model 240 and reported to the baseline database 260, and faults are detected and identified, may be performed at any time or time interval, and/or any number of times to collect and analyze several sets of data, whether or not in real time, or before, during, or after an aircraft flight.

The systems and/or methods for fault detection may operate in real time, and may perform the steps or operations described in this disclosure to detect and identify a fault as many times as desired. In various embodiments, the system for fault detection 200 may operate and analyze the performance of the gas turbine engine 100 at different time intervals. As an illustrative example, the system for fault detection 200 may operate at a first time and a second time, T1 and T2, respectively. With further reference to FIG. 2, at a first time, the gas turbine engine 100 may produce a first actual parameter value 211. Similarly, the first engine model 230 may produce a T1 first estimated parameter value 232 at the first time, and the second engine model 240 may produce a T1 second estimated parameter value 242 at the first time.

In various embodiments, the controller 250 may receive the first actual parameter value 211 from the parameter sensor 215, and receive the T1 first estimated parameter value 232 and the T1 second estimated parameter value 242 from the first engine model 230 and the second engine model 240, respectively. The controller 250 may calculate a T1 first parameter difference 236 by subtracting the T1 first estimated parameter value 232 from the first actual parameter value 211, or by subtracting the first actual parameter value 211 from the T1 first estimated parameter value 232. Likewise, the controller 250 may calculate a T1 second parameter difference 246 by subtracting the T1 second estimated parameter value 242 from the first actual parameter value 211, or by subtracting the first actual parameter value 211 from the T2 second estimated parameter value 242. The controller 250 may report the T1 first parameter difference 236 to the baseline database 260 to establish a first parameter difference baseline 261 of the magnitude of the first parameter differences over a number of time intervals and/or flights (e.g., k flights). The controller 250 may report the T1 first parameter difference 236 to the baseline database 260 if the T1 first parameter difference 236 is a value not above a predetermined detection threshold. Values above the predetermined detection threshold may indicate a fault and may not be used to establish a first parameter difference baseline 261.

The performance observer 270 may receive the T1 second parameter difference 246, and if it is not a value of zero (or any other desired value based on the engine model calibration), the performance observer 270 may produce a first tuning value 272, which may be received by the controller 250. The controller 250 may report the first tuning value 272 to the baseline database 260 to establish a tuning value baseline 266 of the magnitude of the tuning values over a number of time intervals and/or flights (e.g., k flights). The controller 250 may report the first tuning value 272 to the baseline database 260 if the first tuning value 272 is a value not above a predetermined detection threshold. Values above the predetermined detection threshold may indicate a fault and may not be used to establish the tuning value baseline 266. The controller 250 may then use the first tuning value 272 to adjust the second engine model 240, in a closed feedback loop, so the second engine model 240 may produce a T2 second estimated parameter value at a second time that will result in a T2 second parameter difference that is closer to zero (or any other desired value based on the engine model calibration).

At a second time, the controller 250 may receive a second actual parameter value 212 from the parameter sensor 215, a T2 first estimated parameter value 233 from the first engine model 230, and a T2 second estimated parameter value 243 from the second engine model 240, which may be adjusted by the first tuning value 272. The controller 250 may calculate a T2 first parameter difference 237 by subtracting the T2 first estimated parameter value 233 from the second actual parameter value 212, or by subtracting the second actual parameter value 212 from the T2 first estimated parameter value 233. Likewise, the controller 250 may calculate a T2 second parameter difference 247 by subtracting the T2 second estimated parameter value 243 from the second actual parameter value 212, or by subtracting the second actual parameter value 212 from the T2 second estimated parameter value 243. Once these values are received and calculated by the controller 250, the controller 250 may report the T2 first parameter difference 237 to a baseline database 260 to further establish a first parameter difference baseline 261 of the magnitude of the first parameter differences over a number of time intervals and/or flights (e.g., k flights). The controller 250 may report the T2 first parameter difference 237 to the baseline database 260 if the T2 first parameter difference 237 is a value not above the predetermined detection threshold.

The performance observer 270 may receive the T2 second parameter difference 247, and if it is not a value of zero (or any other desired value based on the engine model calibration), the performance observer 270 may produce a second tuning value 273, which will be received by the controller 250. The controller 250 may report the second tuning value 273 to the baseline database 260, if the second tuning value 273 is not above the predetermined detection threshold that may indicate a fault, further establishing the tuning value baseline 266 of the magnitude of the tuning values over a number of time intervals and/or flights (e.g., k flights). The controller 250 may then use second tuning value 273 to adjust the second engine model 240, in a closed feedback loop, so the second engine model 240 may produce a second estimated parameter value 245 at a future time that may result in a second parameter difference 245 at the future time that may be closer to zero (or any other desired value based on the engine model calibration).

With reference to FIGS. 2 and 3, in various embodiments, after the operations described in the foregoing paragraphs take place by the controller 250, the controller 250 may compare the values produced and calculated for the first time and the second time to determine whether a fault has occurred in the gas turbine engine 100. For example, the controller 250 may make transient comparisons between the T1 first parameter difference 236 and the T2 first parameter difference 237, and/or between the first tuning value 272 and the second tuning 273. If the first parameter differences and/or the tuning values have magnitudes that are above the predetermined detection threshold that may indicate a fault, or are not moving toward a value of zero (or any other desired value based on the engine model calibration), a fault in the gas turbine engine 100 may be detected. In other words, the controller may be comparing the values to determine if the gas turbine engine 100 is performing at a consistent level. The controller 250 may compare the T1 first parameter difference 236 and/or the T2 first parameter difference 237 to the first parameter difference baseline 261, and/or compare the first tuning value 272 and/or the second tuning value 273 to the tuning value baseline 266, to determine if the first parameter differences and tuning values are consistent with the baseline data from k flights. If so, there may be no fault detected in the gas turbine engine 100. If not, that may indicate a fault in the gas turbine engine. In general, when first parameter differences and tuning values have magnitudes that are above predetermined detection thresholds, or differ from the first parameter difference baseline or tuning value baseline, respectively, that may indicate an abrupt change in gas turbine engine performance, which may be caused by, and indicate, an engine fault.

With reference to FIG. 3, as discussed above, when a fault is detected, the first parameter difference 235 and/or the tuning value 271 for which the fault was detected may then be calculated or received, respectively, by the controller 250, and the controller 250 may calculate a fault signature for each value, in accordance with various embodiments. With reference to FIG. 3, say, for example, a fault was detected for the T2 first parameter difference 237. The controller 250 may calculate a first parameter fault signature for the T2 first parameter difference 237 by subtracting the first parameter difference baseline 261, taken from the baseline database 260, from the T2 first parameter difference 237, or by subtracting the T2 first parameter difference 237 from the first parameter difference baseline 261. The first parameter fault signature may then be compared, by the controller, to a fault signature database 280, which may comprise first parameter fault signatures and the faults associated with each first parameter fault signature. A fault in the fault signature database 280 that has a first parameter fault signature that most closely matches the first parameter fault signature for the T2 first parameter difference 237 may be the fault that occurred in gas turbine engine 100. As another example, say a fault was detected for the second tuning value 273. The controller 250 may calculate a tuning value fault signature for the second tuning value 273 by subtracting the tuning value baseline 266, taken from the baseline database 260, from the second tuning value 273, or by subtracting the second tuning value 273 from the tuning value baseline 266. The tuning value fault signature may then be compared, by the controller, to a fault signature database 280, which may comprise tuning value fault signatures and the faults associated with each tuning value fault signature. A fault in the fault signature database 280 that has a tuning value fault signature that most closely matches the tuning value fault signature for the second tuning value 273 may be the fault that occurred in gas turbine engine 100. The same process may be completed for any value indicating a fault.

To illustrate the possible timing of the operation of the system for fault detection 200, FIGS. 4A and 4B depict exemplary data collected from controller 250 over multiple flights, including the previous k flights 310, the previous flight 315, the current flight 320A and 320B, during which the system for fault detection 200 may be operating, and the next flight 325. The first parameter difference baseline 261 and tuning value baseline 266, with momentary reference to FIG. 3, are established from the data collected over the previous k flights 310 (which may include the previous flight 315). Fault points 335A and 335B are the times at which a fault occurs during a flight. Fault detection point 330, in FIG. 4A, is the point at which the system for fault detection is operated in a quasi-steady state during the flight and detects any fault that has occurred. In FIG. 3A, the fault detection point 330 is after the fault has occurred at the fault point 335A. Therefore, when the data collected by the controller 250 is read, the fault at the fault point 335A will be detected. The data from the last k flights 310 will be used to detect and identify the fault. As depicted in FIG. 4B, no fault detection point occurs before the fault point 335B during flight 320B. Therefore, the fault that occurred at the fault point 335B will not be detected until a fault detection point 331 during the next flight 325. In FIG. 4B, the data from the quasi-steady states in the next flight 325 may be used, along with the data from the previous k flights 310, to detect and identify the fault 335B that occurred in the current flight 320B. FIGS. 4A and 4B illustrate how the system for fault detection 200 may be useful in detecting faults if it operates in real time over the duration of an aircraft flight and takes as many fault detection points as possible. The more fault detection points, such as 330 and 331, during a flight, the less likely a fault that has occurred during a flight will go undetected during the same flight.

A block diagram illustrating a method for fault detection in an aircraft is depicted in FIG. 5, in accordance with various embodiments. With combined reference to FIGS. 2 and 5, all steps may be performed by the controller 250. Receiving a first actual parameter value at a first time 405 may comprise the controller 250 being in communication with a parameter sensor 215, which is in communication with a gas turbine engine 100, and the parameter sensor 215 reading a first actual parameter value 211 at the first time produced by the gas turbine engine 100, and reporting it to the controller 250. Receiving a T1 first estimated parameter value at the first time 410 may comprise a first engine model 230, which has been calibrated, producing and reporting a T1 first estimated parameter value 232 at the first time to the controller 250, after receiving the input values 205 that the gas turbine engine 100 also received. Receiving a T1 second estimated parameter value at the first time 415 may comprise a second engine model 240, which has been calibrated, producing and reporting a T1 second estimated parameter value 242 at the first time to the controller 250, after receiving the input values 205 that the gas turbine engine 100 also received. Calculating a T1 first parameter difference 420 may comprise the controller 250 subtracting the T1 first estimated parameter value 232 from the first actual parameter value 211, or subtracting the first actual parameter value 211 from the T1 first estimated parameter value 232, to produce the T1 first parameter difference 236. Calculating a T1 second parameter difference 425 may comprise the controller 250 subtracting the T1 second estimated parameter value 242 from the first actual parameter value 211, or subtracting the first actual parameter value 211 from the T1 second estimated parameter value 242, to produce the T1 second parameter difference 246. Reporting the T1 first parameter difference 430 may comprise the controller 250 reporting the T1 first parameter difference 236 to a baseline database 260 to establish a first parameter difference baseline 261 of the magnitude of the first parameter differences over a number of time intervals and/or flights (e.g., k flights). The controller 250 may report the T1 first parameter difference 236 to the baseline database 260 if the T1 first parameter difference 236 is a value not above a predetermined detection threshold. Values above the predetermined detection threshold may indicate a fault and may not be used to establish a first parameter difference baseline 261.

In various embodiments, the method for fault detection in an aircraft may further comprise the steps depicted in the block diagram of FIG. 6. With combined reference to FIG. 2, receiving a first tuning value 505 may comprise a performance observer 270 being in communication with the controller 250 and the second engine model 240. The performance observer 270 may receive and analyze the T1 second parameter difference 246. If the T1 second parameter difference 246 is a value that is not zero (or any other desired value based on the engine model calibration), the performance observer 270 may produce a first tuning value 272 which will be received by the controller 250. Reporting the first tuning value 510 may comprise the controller 250 reporting the first tuning value 272 to the baseline database 260 to establish a tuning value baseline 266 of the magnitude of the tuning values over a number of time intervals and/or flights (e.g., k flights). The controller 250 may report the first tuning value 272 to the baseline database 260 if the first tuning value 272 is a value not above a predetermined detection threshold. Values above the predetermined detection threshold may indicate a fault and may not be used to establish a tuning value baseline 266.

Adjusting the second engine model 515 may comprise the controller 250 using the first tuning value 272 to adjust the second engine model 240, in a closed feedback loop, so the controller's 250 calculation of a T2 second parameter difference at a second time will result in a value closer to zero (or any other desired value based on the engine model calibration).

In various embodiments, the method for fault detection in an aircraft may further comprise the steps depicted in the block diagram of FIG. 7. With combined reference to FIG. 2, receiving a second actual parameter value at a second time 605 may comprise the parameter sensor 215 reading a second actual parameter value 212 at the second time from the gas turbine engine 100 and reporting it to the controller 250. Receiving a T2 first estimated parameter value at the second time 610 may comprise the first engine model 230 producing and reporting a T2 first estimated parameter value 233 at the second time to the controller 250, after receiving the input values 205 that the gas turbine engine 100 also received. Receiving a T2 second estimated parameter value at the second time 615 may comprise the second engine model 240 producing and reporting a T2 second estimated parameter value 243 at the second time to the controller 250, after receiving the input values 205 that the gas turbine engine 100 also received. Calculating a T2 first parameter difference 620 may comprise the controller 250 subtracting the T2 first estimated parameter value 233 from the second actual parameter value 212, or subtracting the second actual parameter value 232 from the T2 first estimated parameter value 233, to produce the T2 first parameter difference 237. Calculating a T2 second parameter difference 625 may comprise the controller 250 subtracting the T2 second estimated parameter value 243 from the second actual parameter value 212, or subtracting the second actual parameter value 232 from the T2 second estimated parameter value 243, to produce the T2 second parameter difference 247. Reporting the T2 first parameter difference 630 may comprise the controller 250 reporting the T2 first parameter difference 237 to the baseline database 260 to further establish the first parameter difference baseline 261 of the magnitude of the first parameter differences over a number of time intervals and flights (k flights). The controller 250 may report the T2 first parameter difference 237 to the baseline database 260 if the T2 first parameter difference 237 is a value not above a predetermined detection threshold.

In various embodiments, the method for fault detection in an aircraft may further comprise the steps depicted in the block diagram of FIG. 8. With combined reference to FIG. 2, receiving a second tuning value 705 may comprise the performance observer 270 receiving and analyzing the T2 second parameter difference 247, and if the T2 second parameter difference 247 is a value that is not zero (or any other desired value based on the engine model calibration), the performance observer 270 may produce a second tuning value 273 which will be received by the controller 250. Reporting the second tuning value 710 may comprise the controller 250 reporting the second tuning value 273 to the baseline database 260 to further establish the tuning value baseline 266 of the magnitude of the tuning values over a number of time intervals and/or flights (e.g., k flights). The controller 250 may report the second tuning value 273 to the baseline database 260 if the second tuning value 273 is a value not above a predetermined detection threshold. Adjusting the second engine model 715 may comprise the controller 250 using the second tuning value 273 to adjust the second engine model 240, in a closed feedback loop, so the second engine model 240 may produce a second estimated parameter value 241 at a future time that will result in a second parameter difference 245 at the future time having a value closer to zero (or any other desired value based on the engine model calibration).

In various embodiments, the method for fault detection in an aircraft may further comprise the steps depicted in the block diagram of FIG. 9. With combined reference to FIGS. 2 and 3, making transient comparisons 805 may comprise the controller 250 making transient comparisons between the T1 first parameter difference 236 and the T2 first parameter difference 237, and/or between the first tuning value 272 and the second tuning 273. Such comparisons may show if the gas turbine engine 100 is operating at a consistent level. Making transient comparisons 805 may comprise the controller 250 comparing the T1 first parameter difference 236 and/or the T2 first parameter difference 237 to the first parameter difference baseline 261, and/or comparing the first tuning value 272 and/or the second tuning 273 to the tuning value baseline 266, to determine if the first parameter differences and/or tuning values are consistent with the data from k flights. In various embodiments, determining a fault 810 may comprise determining if the T1 first parameter difference 236 and T2 first parameter difference 237, and/or the first tuning value 272 and the second tuning value 273, are consistent with one another. If not, a fault in the gas turbine engine 100 may be detected. In various embodiments, determining a fault 810 may comprise determining if the T1 first parameter difference 236 and T2 first parameter difference 237, and/or the first tuning value 272 and the second tuning value 273, are persistently above the predetermined detection thresholds which may indicate a fault. If so, a fault in the gas turbine engine 100 may be detected. In other words, determining if those values are not moving closer to a value of zero (or any other desired value based on the engine model calibration) over time. In various embodiments, determining a fault 810 may comprise determining if the first parameter differences and/or tuning values are different than the first parameter difference baseline 261 and the tuning value baseline 266, respectively. If so, a fault in the gas turbine engine 100 may be determined.

In various embodiments, identifying the fault 815 may comprise calculating a first parameter fault signature by subtracting the first parameter difference baseline 261, taken from the baseline database 260, from the first parameter difference for which a fault was detected with the highest quality number from an aircraft flight, or by subtracting the first parameter difference with the highest quality number from the first parameter difference baseline 261. The first parameter fault signature may then be compared to a fault signature database 280 which may comprise first parameter fault signatures and the faults associated with each first parameter fault signature. A fault in the fault signature database 280 that has a first parameter fault signature that most closely matches the first parameter fault signature being compared may be the fault that occurred in gas turbine engine 100. In various embodiments, identifying the fault 815 may comprise calculating a tuning value fault signature by subtracting the tuning value baseline 266, taken from the baseline database 260, from the tuning value for which a fault was detected with the highest quality number from an aircraft flight, or by subtracting the tuning value with the highest quality number from the tuning value baseline 266. The tuning value fault signature may then be compared to the fault signature database which may further comprise tuning value fault signatures and the faults associated with each tuning value fault signature. A fault in the fault signature database 280 that has a tuning value fault signature that most closely matches the tuning value fault signature being compared may be the fault that occurred in gas turbine engine 100.

In various embodiments, a fault indicator may be activated in response to fault detection. The fault indicator may comprise a light or other indicator. The fault indicator may comprise a visual indicator, or an electronic or graphic display. In various embodiments, the fault indicator may be published to an aircraft airframe, to an aircraft avionics system, or to an engine operator.

System program instructions may be loaded onto a non-transitory, tangible computer readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for fault detection in a single gas turbine engine, comprising:
a controller;
a first engine model and a second engine model in communication with the controller, the first engine model and the second engine model configured to simulate an operational gas turbine engine and produce estimated parameter values;
a performance observer configured to produce tuner values in communication with the controller; and
a tangible, non-transitory memory configured to communicate with the controller, the tangible, non-transitory memory having instructions stored thereon that, in response to execution by the controller, cause the controller to perform operations comprising:
receiving, by the controller, a first actual parameter value at a first time from a parameter sensor in response to an input value received by the gas turbine engine;
receiving, by the controller, a T1 first estimated parameter value at a first time from the first engine model based on the input value;
calculating, by the controller, a T1 first parameter difference based on a difference between the T1 first estimated parameter value and the first actual parameter value;
reporting, by the controller, the T1 first parameter difference, in response to the T1 first parameter difference being not above a predetermined detection threshold, to establish a first parameter difference baseline for the gas turbine engine;
receiving, by the controller, a T1 second estimated parameter value at the first time from the second engine model based on the input value;
calculating, by the controller, a T1 second parameter difference based on a difference between the T1 second estimated parameter value and the first actual parameter value;
receiving, by the controller, a first tuning value from the performance observer based on a magnitude of the T1 second parameter difference at the first time;
reporting, by the controller, the first tuning value, in response to the first tuning value being not above the predetermined detection threshold, to establish a tuning value baseline for the gas turbine engine;
adjusting, by the controller, the second engine model with the first tuning value;
receiving, by the controller, a second actual parameter value at a second time from the gas turbine engine in response to the input value received by the gas turbine engine;
receiving, by the controller, a T2 first estimated parameter value at the second time from the first engine model based on the input value;
calculating, by the controller, a T2 first parameter difference based on a difference between the T2 first estimated parameter value and the second actual parameter value;
reporting, by the controller, the T2 first parameter difference, in response to the T2 first parameter difference being not above the predetermined detection threshold;
receiving, by the controller, a T2 second estimated parameter value at the second time from the second engine model based on the input value;
calculating, by the controller, a T2 second parameter difference based on a difference between the T2 second estimated parameter value and the second actual parameter value;
receiving, by the controller, a second tuning value from the performance observer based on a magnitude of the T2 second parameter difference;
reporting, by the controller, the second tuning value, in response to the second tuning value being not above the predetermined detection threshold;
adjusting, by the controller, the second engine model with the second tuning value;
making, through the controller, transient comparisons between the T1 first parameter difference and the T2 first parameter difference, and transient comparisons between the first tuning value and the second tuning value;
determining, through the controller, whether a fault in the gas turbine engine has occurred based on the transient comparisons determining whether any of the T1 first parameter difference, the T2 first parameter difference, the first tuning value, and the second tuning value are persistently above the predetermined detection threshold;
making, through the controller, transient comparisons between the T1 first parameter difference and the first parameter difference baseline, and between the T2 first parameter difference and the first parameter difference baseline, and making transient comparisons between the first tuning value and the tuning value baseline, and between the second tuning value and tuning value baseline; and
determining, through the controller, whether a fault in the gas turbine engine has occurred based on the transient comparisons determining whether any of the T1 first parameter difference, the T2 first parameter difference, the first tuning value, and the second tuning value are different from the respective first parameter difference baseline and tuning value baseline.

2. The system for fault detection of claim 1, wherein the operations further comprise assigning a quality number to each of the first parameter difference and tuning value.

3. The system for fault detection of claim 2, wherein the quality number is between a value of zero and one.

4. The system for fault detection of claim 2, wherein the operations further comprise identifying the fault by calculating a first parameter difference fault signature based on a difference between the first parameter difference baseline and a first parameter difference with a highest quality number from the current aircraft flight, and comparing the first parameter difference fault signature to a fault signature database.

5. The system for fault detection of claim 1, wherein the operations take place in real time during a current aircraft flight and may be repeated during the aircraft flight as many times as desired.

6. A method for fault detection in a single gas turbine engine, comprising:
receiving, by a controller, a first actual parameter value at a first time from a parameter sensor in communication with the controller in response to an input value received by the gas turbine engine;
receiving, by the controller, a T1 first estimated parameter value at the first time from a first engine model, and a T1 second estimated parameter value at the first time from a second engine model based on the input value;

calculating, by the controller, a T1 first parameter difference based on a difference between the T1 first estimated parameter value and the first actual parameter value, and calculating a T1 second parameter difference based on a difference between the T1 second estimated parameter value and the first actual parameter value;

reporting, by the controller, the T1 first parameter difference, in response to the T1 first parameter difference being not above a predetermined detection threshold, to establish a first parameter difference baseline for the gas turbine engine;

receiving, by the controller, a first tuning value from a performance observer based on a magnitude of the T1 second parameter difference;

reporting, by the controller, the first tuning value, in response to the first tuning value being not above the predetermined detection threshold, to establish a tuning value baseline for the gas turbine engine;

adjusting, by the controller, the second engine model with the first tuning value;

receiving, by the controller, a second actual parameter value at a second time from the parameter sensor in response to the input value received by the gas turbine engine;

receiving, by the controller, a T2 first estimated parameter value at the second time from the first engine model based on the input value, and a T2 second estimated parameter value at the second time from the second engine model based on the input value;

calculating, by the controller, a T2 first parameter difference based on a difference between the T2 first estimated parameter value and the second actual parameter value, and calculating a T2 second parameter difference based on a difference between the T2 second estimated parameter value and the second actual parameter value;

reporting, by the controller, the T2 first parameter difference, in response to the T2 first parameter difference being not above the predetermined detection threshold;

receiving, by the controller, a second tuning value from the performance observer based on a magnitude of the T2 second parameter difference;

reporting, by the controller, the second tuning value, in response to the second tuning value being not above the predetermined detection threshold;

adjusting, by the controller, the second engine model with the second tuning value;

making, by the controller, transient comparisons between the T1 first parameter difference and the T2 first parameter difference, and between the first tuning value and the second tuning value;

determining, by the controller, whether a fault in the gas turbine engine has occurred based on the transient comparisons determining if any of the T1 first parameter difference, the T2 first parameter difference, the first tuning value, and the second tuning value are persistently above the predetermined detection threshold;

making, by the controller, transient comparisons between the T1 first parameter difference and the T2 first parameter difference, and between the first tuning value and the second tuning value;

determining, by the controller, whether a fault in the gas turbine engine has occurred based on the transient comparisons determining if any of the T1 first parameter difference, the T2 first parameter difference, the first tuning value, and the second tuning value are persistently above the predetermined detection threshold;

making, by the controller, transient comparisons between the T1 first parameter difference and the first parameter difference baseline, and between the T2 first parameter difference and the first parameter difference baseline, and making transient comparisons between the first tuning value and the tuning value baseline, and between the second tuning value and tuning value baseline; and determining, by the controller, whether a fault in the gas turbine engine has occurred based on the transient comparisons determining whether any of the T1 first parameter difference, the T2 first parameter difference, the first tuning value, and the second tuning value are different from the respective first parameter difference baseline and tuning value baseline.

7. The method of fault detection of claim 6, further comprising identifying the fault by calculating a tuning value fault signature based on a difference between the tuning value baseline and a tuning value with a highest quality number from a current aircraft flight, and comparing the tuning value fault signature to a database of tuning value fault signatures.

8. The method of fault detection of claim 6, further comprising identifying the fault by calculating a first parameter fault signature based on a difference between the first parameter difference baseline and a first parameter difference with a highest quality number from a current aircraft flight, and comparing the first parameter fault signature to a database of first parameter fault signatures.

9. The method for fault detection of claim 6, wherein the method takes place in real time during an aircraft flight and wherein the calculating, by the controller, the T1 first parameter difference based on the difference between the T1 first estimated parameter value and the first actual parameter value, and calculating the T1 second parameter difference based on the difference between the T1 second estimated parameter value and the first actual parameter value is repeated during the aircraft flight.

10. An article of manufacture including a tangible, non-transitory computer-readable storage medium having instructions stored thereon for detecting a fault in a single gas turbine engine that, in response to execution by a controller, cause the controller to perform operations comprising:

receiving, by the controller, a first actual parameter value at a first time from a parameter sensor in communication with the controller in response to an input value received by a gas turbine engine;

receiving, by the controller, a T1 first estimated parameter value at a first time from a first engine model, and a T1 second estimated parameter value at the first time from a second engine model based on the input value;

calculating, by the controller, a T1 first parameter difference based on a difference between the T1 first estimated parameter value and a first actual parameter;

calculating, by the controller, a T1 second parameter difference based on a difference between the T1 second estimated parameter value and the first actual parameter value;

reporting, by the controller, the T1 first parameter difference, in response to the T1 first parameter difference being not above a predetermined detection threshold, to establish a first parameter difference baseline for the gas turbine engine receiving, by the controller, a first tuning value from a performance observer based on a magnitude of the T1 second parameter difference;

reporting, by the controller, the first tuning value, in response to the first tuning value being not above the predetermined detection threshold, to establish a tuning value baseline for the gas turbine engine;

adjusting, by the controller, the second engine model with the first tuning value;

receiving, by the controller, a second actual parameter value at a second time from the parameter sensor in response to the input value received by the gas turbine engine;

receiving, by the controller, a T2 first estimated parameter value at the second time from the first engine model based on the input value, and a T2 second estimated parameter value at the second time from the second engine model based on the input value;

calculating, by the controller, a T2 first parameter difference based on a difference between the T2 first estimated parameter value and a second actual parameter value obtained at the second time from the parameter sensor;

calculating, by the controller, a T2 second parameter difference based on a difference between the T2 second estimated parameter value and the second actual parameter value;

reporting, by the controller, the T2 first parameter difference, in response to the T2 first parameter difference being not above the predetermined detection threshold;

producing, by the controller, a second tuning value from the performance observer based on a magnitude of the T2 second parameter difference;

reporting, by the controller, the second tuning value, in response to the second tuning value being not above the predetermined detection threshold;

making transient comparisons between the T1 first parameter difference and the T2 first parameter difference, and between the first tuning value and the second tuning value;

determining, by the controller, whether a fault in the gas turbine engine has occurred based on the transient comparisons determining if any of the T1 first parameter difference, the T2 first parameter difference, the first tuning value, and the second tuning value are persistently above the predetermined detection threshold;

making, by the controller, transient comparisons between the T1 first parameter difference and the T2 first parameter difference, and between the first tuning value and the second tuning value;

determining, by the controller, whether a fault in the gas turbine engine has occurred based on the transient comparisons determining if any of the T1 first parameter difference, the T2 first parameter difference, the first tuning value, and the second tuning value are persistently above the predetermined detection threshold;

making, by the controller, transient comparisons between the T1 first parameter difference and the first parameter difference baseline, and between the T2 first parameter difference and the first parameter difference baseline, and making transient comparisons between the first tuning value and the tuning value baseline, and between the second tuning value and tuning value baseline; and determining, by the controller, whether a fault in the gas turbine engine has occurred based on the transient comparisons determining whether any of the T1 first parameter difference, the T2 first parameter difference, the first tuning value, and the second tuning value are different from the respective first parameter difference baseline and tuning value baseline.

* * * * *